(12) United States Patent
McConnell et al.

(10) Patent No.: US 7,925,974 B1
(45) Date of Patent: Apr. 12, 2011

(54) DISTRIBUTION OF COMPUTATION LINGUISTICS

(75) Inventors: Von McConnell, Leawood, KS (US); Warren Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1195 days.

(21) Appl. No.: 11/359,280

(22) Filed: Feb. 22, 2006

Related U.S. Application Data

(63) Continuation-in-part of application No. 11/315,958, filed on Dec. 22, 2005, now Pat. No. 7,461,033.

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06F 15/18* (2006.01)

(52) U.S. Cl. ........... 715/256; 715/259; 715/260; 706/12

(58) Field of Classification Search .................. 715/256, 715/259, 260; 706/12
See application file for complete search history.

(56) References Cited

U.S. PATENT DOCUMENTS

| | | | | |
|---|---|---|---|---|
| 5,983,170 | A * | 11/1999 | Goodman | 704/9 |
| 6,289,304 | B1 * | 9/2001 | Grefenstette | 704/9 |
| 7,130,812 | B1 * | 10/2006 | Iyer et al. | 705/10 |
| 7,366,711 | B1 * | 4/2008 | McKeown et al. | 707/3 |
| 2003/0023755 | A1 * | 1/2003 | Harris et al. | 709/246 |
| 2003/0105848 | A1 * | 6/2003 | Henry | 709/223 |
| 2003/0191832 | A1 * | 10/2003 | Satyavolu et al. | 709/223 |
| 2004/0001081 | A1 * | 1/2004 | Marsh | 345/721 |
| 2005/0033657 | A1 * | 2/2005 | Herrington et al. | 705/26 |
| 2006/0085743 | A1 * | 4/2006 | Baudisch et al. | 715/526 |

* cited by examiner

*Primary Examiner* — Stephen S Hong
*Assistant Examiner* — Nicholas R Hasty

(57) ABSTRACT

A system and methods for distributing media data regarding a specific topic to a user. The system comprises a media-host device, server, and distribution module. The media-host device submits a request for the media data, receives a textual structure summarizing the specific topic, and presents the textual structure to the user. The server stores the textual structure. The distribution module communicates the textual structure to the media-host device. One method comprises receiving a request to present the textual structure, retrieving the textual structure, formatting the textual structure to be readable by a media-host device, and transmitting the textual structure to the media-host device. Another method comprises determining the format of the media-host device, formatting the textual structure to be presentable on the media-host device, and transmitting the formatted textual structure to the media-host device.

20 Claims, 9 Drawing Sheets

DISTRIBUTION OF COMPUTATION LINGUISTICS

CROSS-REFERENCE TO RELATED APPLICATIONS

This application is a continuation of and claims priority pursuant to 35 U.S.C. §120 from U.S. patent application Ser. No. 11/315,958, which was filed on Dec. 22, 2005.

STATEMENT REGARDING FEDERALLY SPONSORED RESEARCH OR DEVELOPMENT

Not applicable.

BACKGROUND OF THE INVENTION

The Internet is a worldwide system of interconnected computer networks that transmit data in packets. Various information and services are carried over the Internet, such as electronic mail (e-mail), online chat rooms, and the World Wide Web (the Web). In particular, the Web is an information space in which online documents called web pages are stored and published for the entire computing world to access. Anyone connected to the Internet can view the myriad of web pages available online by accessing global identifiers called Uniform Resource Identifiers (URIs).

A web page is a simple file containing, for example, text and a set of Hypertext Markup Language (HTML) tags that describe how the text should be formatted on a screen. HTML tags are simple instructions that tell web browsers how a web page should look when it is displayed. For example, HTML tags may describe a web page's fonts, colors, title, etc. Furthermore, web pages may be accessed via the Hypertext Transfer Protocol (HTTP) and may be displayed according to HTML tags by a software package called a web browser. Web browsers identify web pages on web servers by their URIs. Examples of web browsers include Microsoft® Internet Explorer, Opera Netscape Navigator, Firefox, and Thunderbird. Once a web page is retrieved, the web browser interprets the page's HTML tags and displays it accordingly on a screen.

A web site is a collection of individual related web pages. Examples of different types of web sites include archive, business, database, and news sites. One specific type of web site gaining popularity today is the "weblog," also known as "blog." A blog is a web site containing periodic articles and posts, usually presented in reverese chronological order. Generally, blogs are much simpler than other web sites. Rather than being composed of many individual pages connected by hyperlinks, blogs are composed of a few templates (usually Main Page, Archive Page, and Individual Article/Item Page), into which content is fed from a database. This allows for easy creation of new pages, since new data is entered into a simple template and then submitted, which effectively adds the article to the blog.

All language is biased by its basic nature and is a consequence of individual history, opinions, context, ethics, experiences, belief structures, or other bias. Consequently, web pages and blog posts are typically slanted to the author's point of view. There are many instances where users may wish to substitute their own preferred biases for those of a web page or blog author.

Since its inception, the Web has rapidly expanded to include a vast and diverse amount of online information and provide a global forum for unregulated public speech. With the advent of new web-building software, such as Microsoft® FrontPage®, Macromedia Dreamweaver, Mozilla Composer, Blogger, Xanga, Typepad, etc., it has become much easier to create and publish information online. As a result, a plethora of web pages, blogs, and other online sources that describe and discuss nearly every aspect of life are readily available on the Web. Internet search engines like Google and Yahoo! search online documents using keyword-driven search technology. However, these services merely direct a user to web pages. They do not synopsize information, alleviate author bias, or allow the user to interpret the information with their own particular bias. Also, as the number of online documents keeps increasing, keyword-driven searches will provide larger results for a user to navigate through for information. Therefore, a need exists to assimilate blogs and web pages by specific topic, analyze them, and summarize their underlying objective content.

BRIEF SUMMARY OF THE INVENTION

The present invention distributes a generated, textual structure summarizing media data to a user, regardless of which type of media-host device the user is accessing. In embodiments of the present invention, distribution of the textual structure to the user is performed using a media-host device, server, and distribution module. The media-host device submits a summary of data regarding a specific topic, receives the grammatically correct textual structure, and presents the textual structure to the user. The server stores the textual structure once the textual structure is created by a language generation processor. The distribution module communicates the textual structure to the media-host device using various methods.

In the present invention, multiple modules create and generate objective textual structures that summarize information about a specific topic contained in a plurality of web documents. An ontology module receives a feed of web documents in response to a request for information about the specific topic. The ontology module parses the textual structures in each document and tags any information relevant to the topic. A summation module sorts through all of the information tagged by the ontology module and creates an interpretation of the information's content. A language bias module adjusts the interpretation to account for bias and creates an objective interpretation. A language generation module uses predefined grammar rules and templates to create a grammatically correct textual structure detailing the objective interpretation.

DETAILED DESCRIPTION

Various embodiments will be better understood from the detailed description provided below and from the accompanying drawings. However, the detailed description and drawings should not be read to limit the claims. Rather, these specifics are provided for explanatory purposes.

Figure 1:
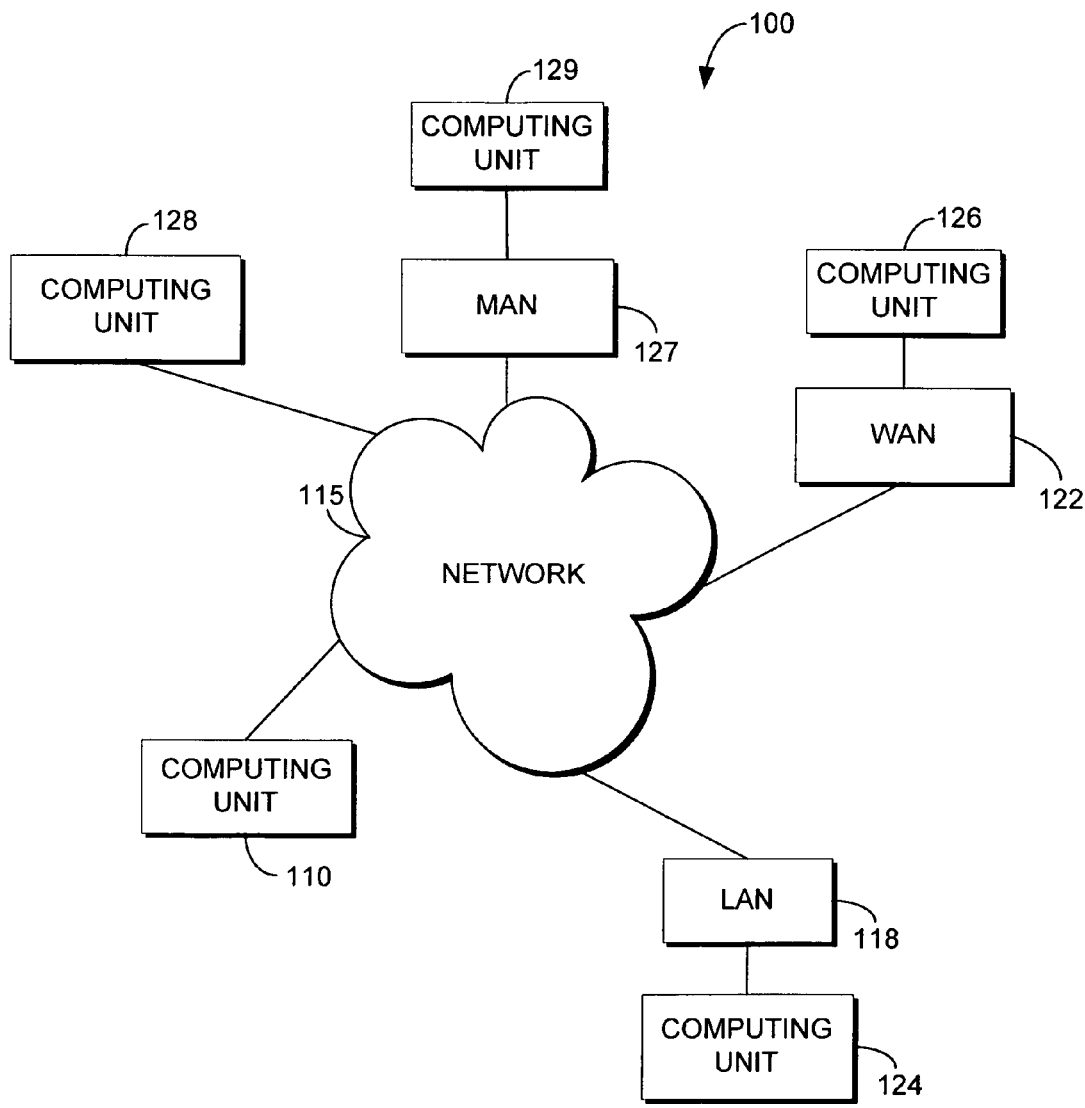
FIG. 1 is a block diagram of a network environment that is suitable for use in implementing the present invention.

Referring initially to FIG. 1 in particular, a network environment that is suitable for use implementing the present invention is illustrated. Network environment 100 is but one example of a suitable environment and is not intended to limit the scope of use or functionality of the invention. Neither should network environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant, handheld device, television, or video-display system. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, network environment 100 includes computing unit 110 coupled with network 115. Computing units 110, 124, 126, 128 and 129 represent computing devices that can read and execute software instructions. Examples of such devices include a computer, server, printer, PDA, hand-held device, cellular phone, digital device, television, or the like. However, embodiments are not limited to any particular number of computing devices or any particular configuration or assortment thereof. In an embodiment, each computing unit includes a plurality of computing devices. Network 115 represents a system for communication between computing units. In an embodiment, network 115 comprises an Internet service provider (ISP), which is an entity providing access to the Internet. In another embodiment, network 115 comprises multiple ISPs coupled together. Examples of such entities include Netzero, Juno, Earthlink, or the like. However, network 115 is not limited to ISPs, and, in embodiments, may comprise private networks. Such private networks may include, for example, a small office/home office (SOHO) network, value-added network (VAN), peer-to-peer network, bus network, Ethernet, star network, ring network, mesh network, star-bus network, or similar network for communicating information between multiple computers. In an embodiment, network 115 comprises a backplane bus to accommodate multiple modules placed in the same physical cabinet.

Computing units 110, 124, 126, 128 and 129 are coupled with network 115 via wireless connection, dial-up line, high-speed phone line (such as a T1 or T3 connection), fiber-optic line, or similar transmission line. In an embodiment, LAN 118 represents a local area network, which couples computing unit 124 with network 115. In an embodiment, computing unit 124 represents multiple computing units that are interconnected via LAN 118. In an embodiment, WAN 122 represents a wide area network, which couples computing unit 126 with ISP 115. In an embodiment, computing unit 126 represents multiple computing units that are interconnected via WAN 122. In an embodiment, MAN 127 represents a metropolitan area network, which couples computing unit 129 with network 115. In an embodiment, computing unit 129 represents multiple computing units that are interconnected via MAN 127.

Computing units 110, 124, 126, 128 and 129 may include a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information. In addition, the computing units illustrated in FIG. 1 may also comprise computer-storage media in the form of volatile and/or nonvolatile memory. The memory may be removable, nonremovable, or a combination thereof. Exemplary hardware devices include solid-state memory, hard drives, optical-disc drives, cache, real time memory, etc.

Figure 2:
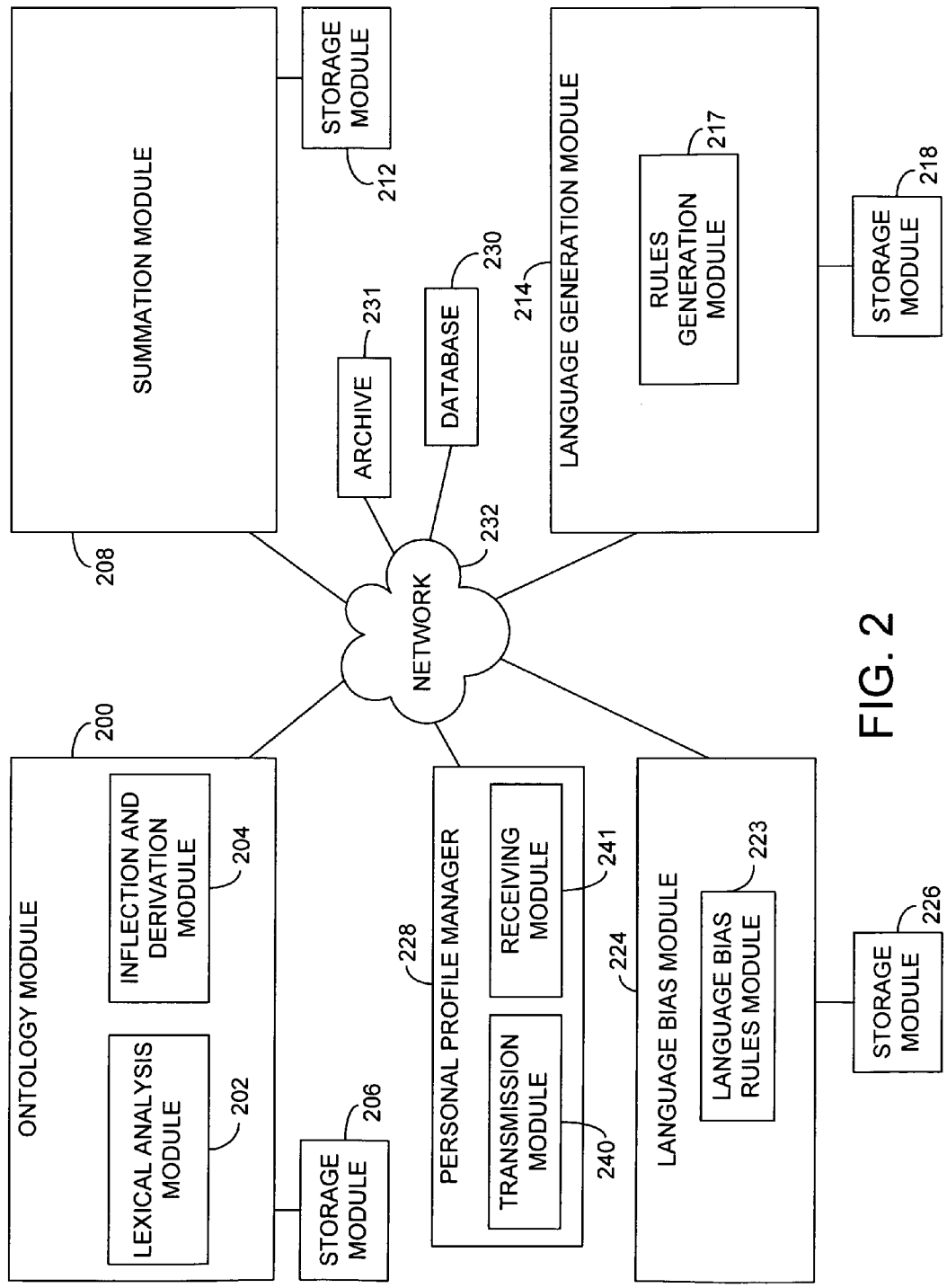
FIG. 2 is a block diagram of a system for generating a textual structure that summarizes information provided by various web pages or blogs about a specific subject, according to embodiments of the present invention.

FIG. 2 is a block diagram of a system for generating a textual structure that summarizes information provided by various web pages or blogs about a specific subject, according to embodiments of the present invention. As illustrated in FIG. 2, ontology module 200, summation module 208, language generation module 214, and language bias module 224 refer to hardware or software components. Examples of such components include, for example, machine instructions, assembly language, software code, logic chips, fuzzy logic, Boolean logic, high-level matrix recoding, microprocessors, neural networks, central processing units (CPUs), microcontrollers, any combination thereof, or similar hardware or software. The above list is not meant to be exhaustive, and embodiments are not limited to any specific type of hardware or software. Rather, each of the above modules may comprise any hardware or software capable of executing instructions.

In one embodiment, ontology module 200, summation module 208, language generation module 214, and language bias module 224 are separate modules. In other embodiments, a single module functions as a combination of ontology module 200, summation module 208, language generation module 214, or language bias module 224. In yet other embodiments, multiple modules are coupled together creating one of the modules illustrated in FIG. 2. For example, ontology module 200 may comprise parallel CPUs. In another embodiment, the modules illustrated in FIG. 2 are positioned within a single computing system. For example, storing ontology module 200's parallel CPUs may be stored in the same cabinet. However, embodiments are not limited to any particular software or hardware setup.

In an embodiment, ontology module 200, summation module 208, language generation module 214, and language bias module 224 execute on separate computing units. For example, without limitation, the four modules of FIG. 2 may be running on four separate computers. In another embodiment, multiple modules execute on the same computing unit. For example, all four modules of FIG. 2 may be running within a single cabinet.

In embodiments, the components illustrated in FIG. 2 communicate with each other via network 232. Many computing network connections may function as network 232, including, without limitation, wireless, a telephone line, high-speed line, fiber-optic line, local area network (LAN), wide area network (WAN), cable network, or the like. However, network 232 is not limited to connections coupling separate computer units. Rather, network 232 may also comprise subsystems that transfer data or power between computer. For example, network 232 may also include a point-to-point connection, an internal system Ethernet, a backplane bus, an electrical bus, a neural network, or other internal system. In an embodiment where network 232 comprises a LAN networking environment, components are connected to the LAN through a network interface or adapter. In an embodiment where network 232 comprises a WAN networking environment, components use a modem, or other means for establishing communications over the WAN, to communicate. In embodiments where network 232 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

Storage modules 206, 212, 218, 226, archive 231, and database 230 comprise computer-storage media in the form of volatile and/or nonvolatile memory. In embodiments, they may include, but are not limited to, RAM, ROM, EEPROM, flash memory, cache memory, compressed memory, or other memory technology, CD-ROM, DVD, or other optical disk storage, magnetic cassettes, magnetic tape, magnetic disk storage, or other magnetic storage devices, or any other medium which can be used to store the desired information. Additionally, the memory may be removable, nonremovable, or a combination thereof. Furthermore, database 230 and archive 231 are central memory stores that can be accessed by any component coupled with network 232.

In an embodiment, storage module 206 stores an information set created by ontology module 200. An information set comprises various data referencing a textual structure's syntax, definition, or underlying meaning. In addition, in embodiments, an information set may also comprise associated root words, lexicons, homonyms, synonyms, or other related lexical ontology. Information sets may comprise, for example, words, definitions, phrases, as well as software references such as alphanumeric markers, numeric markers, or pointers. However, information sets are not limited to any specific type of stored data type.

In an embodiment, storage module 212 stores a structure interpretation generated by summation module 208. A structure interpretation comprises various data that summarizes the information contained in a plurality of information sets. Structure interpretations may comprise, for example, words, definitions, or phrases as well as software references such as alphanumeric markers, numeric markers, or pointers. However, structure interpretations are not limited to any specific type of stored data type.

In another embodiment, storage module 218 stores a grammatically correct textual structure created by language generation module 214. In another embodiment, storage module 226 stores web source bias values used by language bias module 224.

As FIG. 2 illustrates, in embodiments, storage modules 206, 212, 218, and 226 are located off-board and coupled with ontology module 200, summation module 208, language generation module 214, or language bias module 224. However, FIG. 2 merely depicts one exemplary embodiment and the present invention is not limited to any method of coupling or accessing memories. For example, in embodiments, storage modules 206, 212, 218, and 226 respectively reside on-board ontology module 200, summation module 208, language generation module 214, or language bias module 224. In another embodiment, storage modules 206, 212, 218, and 226 are coupled with ontology module 200, summation module 208, language generation module 214, or language bias module 224 via network 232. Furthermore, to prevent information stored in storage modules 206, 212, 218, and 226 from becoming stale, different methods for purging data may be used and are well known in the art.

In an embodiment, database 230 is a central memory that is accessible via network 232 by ontology module 200, summation module 208 personal profile manager 228, language bias module 224, language generation module 214, or any combination thereof. In one embodiment, database 230 is a logical database comprised of multiple databases. In an embodiment, database 230 is a single database. In an embodiment, database 230 stores commonly used information. For example, database 230, in an embodiment, stores an information set, structure interpretation, newly generated textual structure, user bias preferences, text grammatical intent and underlying base structure, or other information used by the inventive modules. To prevent information stored in database 230 from becoming stale, different methods for purging data may be used and are well known in the art.

In operation, ontology module 204 parses textual structures resident on accumulated web pages or blogs revealing grammatical syntax and underlying semantics. In an embodiment, ontology module 204 also classifies parsed textual structures into manageable information sets and stores the information sets into either storage module 206 or database 230. In an embodiment, information sets are cached for quick future retrieval. In general, ontology module 200 categorizes accumulated web textual structures, which include words, abbreviations, sentences, numbers, phrases, or other language contained on a web page or blog. In an embodiment, ontology module 200 comprises lexical analysis module 202 and inflection and derivation module 204.

In an embodiment, parsing cannot proceed in the absence of lexical analysis, and so it is sometimes necessary to first identify the root forms of word occurrences in web textual structures and determine their parts of speech. Lexical analysis module 202 is a program, routine, subroutine, or other set of instructions for parsing textual structures on a web page into basic grammatical components. Such grammatical components include, for example, nouns, verbs, adjectives, adverbs, etc. In an embodiment, ontology module 200 tags textual structures with an alphanumeric value to describe their underlying grammatical syntax. In embodiments, the alphanumeric values are stored in storage module 206 or database 230. Furthermore, lexical analysis module 202 may also use various well known methods in the art to determine grammatical syntax. For example, many modern word processors contain grammar functions that classify written text to determine whether a specific sentence is lacking a noun or a verb. Methods employed by such word processor applications can similarly be used by lexical analysis module 202 to determine grammatical syntax of accumulated web textual structures.

In addition to tagging textual structures according to underlying syntax, ontology module 200 uses inflection and derivation module 204 to determine the underlying semantics of accumulated textual structures. Inflection and derivation module 204 is a program, routine, subroutine, or other set of instructions for revealing underlying grammatical intent of each accumulated web textual structure. In general, language is an accumulation of known definitions of words. Therefore, in an embodiment, inflection and derivation module 204 determines each accumulated textual structure's definition by referencing and cross-referencing known definitions from published sources. Such sources may include dictionaries, thesauri, encyclopedias, etc. However, the present invention is not limited to any particular type or number of published sources. In embodiments, such known definitions are accessed over the Internet, or a private network, or are stored in database 230, storage module 206, or other computer-readable media.

One limitation to matching textual structures with known definitions is the fact that numerous words have multiple meanings. For example, "lie" may mean an assertion that is untrue or to occupy a certain position. To account for multiple definitions, inflection and derivation module 204, in an embodiment, cross-references multiple known existing definitions contained in various published sources and uses a statistical analysis to determine which definition was meant. The statistical analysis will inevitably determine a textual structure's definition among a database of definitions by comparing the frequency of specific parameters. In an embodiment, the statistical analysis takes into account the number of times a textual structure has previously been mapped to a specific definition. For example, if "lie" has previously been used 1,000 times to mean an untrue assertion, while only 100 times for occupying a position, it is more probable that "lie" was meant to refer to an untrue assertion.

In an embodiment, multiple published sources are cross-referenced to account for slang meanings or alternative definitions. Such sources may include, for example, slang dictionaries, alternative dictionaries, etc. Another limitation arises when new words are constantly introduced. To account for additions to language, in an embodiment, a separate dictionary or memory storage is continually updated with newly defined words, and cross-referenced to determine a textual structure's underlying meaning. In an embodiment, the memory storage is updated by a system administrator. The system administrator may be, for example, a person given supervisory rights over the system or a global program. However, embodiments are not limited to any specific type or quantity of system administrators.

In an embodiment, the statistical analysis also takes into account subtending classifications to achieve more relevant contextual definitions. Subtending classifications are textual structures that contain interconnected meanings. For example, "Republican" would be classified as a noun, plus have subtending classifications such as "political," "politician," "affiliation," etc. In an embodiment, ontology module 200 determines a subtending classification by comparing a textual structure's known definition with other closely related definitions. Once uncovered, in an embodiment, the subtending classification is tagged or referenced to denote closely related definitions in storage module 206 or database 230. In another embodiment, ontology module 200 associates subtending classifications with a textual structure from a database or other computer-readable medium that stores such classifications. Such databases or media may be uploaded from a vendor, supplied by a user through personal profile manager 228, or consistently updated by ontology module 200 after an association is determined.

Once a textual structure's definition is determined, it is stored, in embodiments, in either storage module 206 or database 230 as an information set. In other embodiments, definitions for each textual structure are given a reference pointer comprising a numeric or alphanumeric representation, which references a definition stored in database 230, storage module 206, or other memory storage structure that stores definitions. For such embodiments, an information set comprises all of the pointers for a particular web page. In an embodiment, pointers are used to reference slang definitions, alternative meanings, subtending classifications, or child branches. Ontology module 200 provides such pointers from definitions back to the original web page or blog from which the textual structure was accumulated.

In linguistic parlance, stemmers are morphological analyzers that associate variants of the same term with a root from. The root can be understood as the form that would normally be found as an entry in a dictionary. For instance, "go," "goes," "going," "gone," and "went" are associated with the root form "go." In general, there are two types of morphological analyzers: inflectional and derivational. Inflectional morphology expresses syntactic relations between words of the same part of speech (e.g. inflate and inflates), while derivational morphology expresses lexical relations between words that can be different parts of speech (e.g. inflate and inflation). More specifically, inflectional morphology stemmers comprise variations in word forms needed to express grammatical features, such as singular/plural or past/present tense. On the other hand, derivational morphology stemmers comprise new words created from old words in which bother are related by a common root form. Derivation stemmers usually involve a change in the grammatical category of a word, and may also involve a modification to its meaning. For example, "unkind" is formed from "kind," but has the opposite meaning. Derivational morphology stemmers may also include synonyms or homonyms. For example, the word "old" may be referenced to "elderly." In an embodiment, inflection and derivation module 204 uses various alphanumeric pointers to point to different definitions accounting for inflectional and derivational morphology stemmers.

In an embodiment, summation module 208 aggregates parsed textual structures accumulated from a plurality of web pages into at least one structure interpretation of the specific topic. In an embodiment, summation module 208 accesses the information sets created by ontology module 200, and summation module 208 executes matching routines across multiple information sets. In operation, summation module 208, in an embodiment, determines the syntactical structures (e.g. noun, verb, adjective, etc.) of all textual structures in an information set. Then, in an embodiment, summation module 208 uses the syntactical textual structures in combination with the tagged definitions of the textual structures to determine the relevant portions of information regarding the specific topic. In an embodiment, summation module 208 determines the number of times all information sets use each textual structure as a specific type to mean a particular definition. The number of times is counted to determine the most probable relationship of information from which to form a structure interpretation. In addition, embodiments may also use various subtending classifications and associated words as parameters when running probability analyses.

In an embodiment, summation module 208 follows such structures as outlined in the Standard Upper Merged Ontology (SUMO) of the Institute of Electrical and Electronics Engineers (IEEE) standard upper ontology-working group. Whereas ontology module 204 indexes information from individual web pages, summation module 208 sums information across multiple web pages. Furthermore, summation module 208 couples to network 232 and is optionally coupled with storage module 212, which stores structure interpretations created by summation module 210. In an embodiment, a structure interpretation comprises a list of words taken from a plurality of information sets describing the requested topic. In other embodiments, a structure interpretation comprises a collection of alphanumeric or numeric markers, pointers, or other indicia of textual structures' syntax or semantics.

In an embodiment, language generation module 214 comprises rules generation module 217. Language generation module 214 is a program, routine, subroutine, or other set of software instructions that, when executed, constructs and generates new grammatically correct sentence structures that describe new structure interpretations generated by summation module 208. Grammatical templates provide basic grammar confines, such as noun/verb association, syntax structure, punctuation, etc., within which to build grammatically correct sentences. These grammatical templates are contained in and uploaded to rules module 217, which, in an embodiment, is a program, routine, subroutine, or other set of software instructions. In embodiments, grammatical templates are manually loaded by a system administrator and then modified by individual users in personal profile manager 228. In another embodiment, grammar templates are referenced within other systems, such as large-scale academic or commercial systems. Furthermore, grammatical templates for various languages, such as English, Spanish, French, etc., may be used to govern new sentence generation. Moreover, language generation module 214 is optionally coupled with storage module 218. In embodiments, newly constructed grammatically correct sentences are stored in storage module 218, database 230, or archive 231.

In an embodiment, language bias module 224 includes language bias rules module 223. In general, language bias module 224 is a program, routine, subroutine, or other set of software instructions that, when executed, reformats newly generated textual structures to account for user or system bias preferences. In an embodiment, language bias rules module 223 is a memory that stores a library of rules used to correct source bias. In embodiment, these rules are set by a system administrator or the user and used to mark the bias of certain sources. The system administrator can set values corresponding to different levels of bias and upload them to language bias rules module 223. For example, the administrator may assign the New York Times' web site with a value describing it as a liberal newspaper. Thereafter, text taken from that site about Republican presidential candidates may be given less deference than text taken from a less liberal newspaper. In addition, subscribing users who prefer a more conservative view of information can be excluded from receiving textual structures from a New York Times article.

In an embodiment, language bias rules module 223 stores a list of terms or templates that can be inserted into newly constructed sentence structures to account for source bias. In an embodiment, language bias rules module 223 assigns values to a web page corresponding to its relative bias. However, embodiments are not limited to the system administrator setting bias preferences. In an embodiment, language bias rules module 223 stores bias values associated with individual words. For example, the word "old" may be marked as more offensive in certain contexts than the word "mature." Accordingly, an alphanumeric marker may be assigned that describes "mature" as a less offensive word.

In an embodiment, personal profile manager 228 comprises transmission module 240 and receiving module 241. In an embodiment, receiving module 241 receives individual user traits (e.g. demographic location, political association, preferences of topics, bias preferences, etc.) and stores such traits in database 230. However, embodiments of the present invention are not limited to any particular traits. In an embodiment, transmission module 240 broadcasts such information to network 232 as user-specific parameters. In an embodiment, personal profile manager 228 requires users to register and set user-specific parameters. In another embodiment, personal profile manager 228 contains a field for a user to request information about a specific topic. In yet another embodiment, the user's request is compared with results stored in database 230 to determine whether an answer has already been created. In an embodiment, users may continually reference and use existing bias templates or create and customize their own bias templates.

In an embodiment, archive 231 is a central memory that is accessible via network 232 by ontology module 200, summation module 208 personal profile manager 228, language bias module 224, language generation module 214, or any combination thereof. In one embodiment, archive 231 is a logical database comprised of multiple databases. In another embodiment, archive 231 is a single database. In operation, archive 231 stores textual structures created by language generation module 214. Archive 231, in an embodiment, is coupled with network 232 and accessible by any component (e.g. module or computer-storage media) also coupled with network 232. Furthermore, to prevent information stored in archive 231 from becoming stale, different methods for purging data may be used and are well known in the art. In an embodiment, archive 231 stores language generation module 214's newly generated textual structures. Once a textual structure is generated for a specific topic and within a common template, the textual structure is stored in archive 231 for future use. In an embodiment, the textual structure is stored in a compressed manner. However, embodiments are not limited to any specific encoding scheme. In an embodiment, archive 231 is accessed to determine whether it contains a textual structure answering a topic request. In an embodiment, the textual structure is kept for a specific amount of time that is set by an administrator. In another embodiment, the textual structure is stored for a specific amount of time that is set by user. For example, where a blog is dedicated to natural disasters, archive 231 may store textual structures detailing different aspects of a particular disaster (e.g., a hurricane), such as wind velocity, death toll, damage, etc. When a new disaster arises, archive 231's resident information about the old disaster is purged, and new textual structures detailing characteristics of the new disaster are archived. Other forms of purging stale content may also be used and are well known in the art. Also, the length of time for keeping the textual structure, in an embodiment, is stored in personal profile manager 228.

Figure 3:
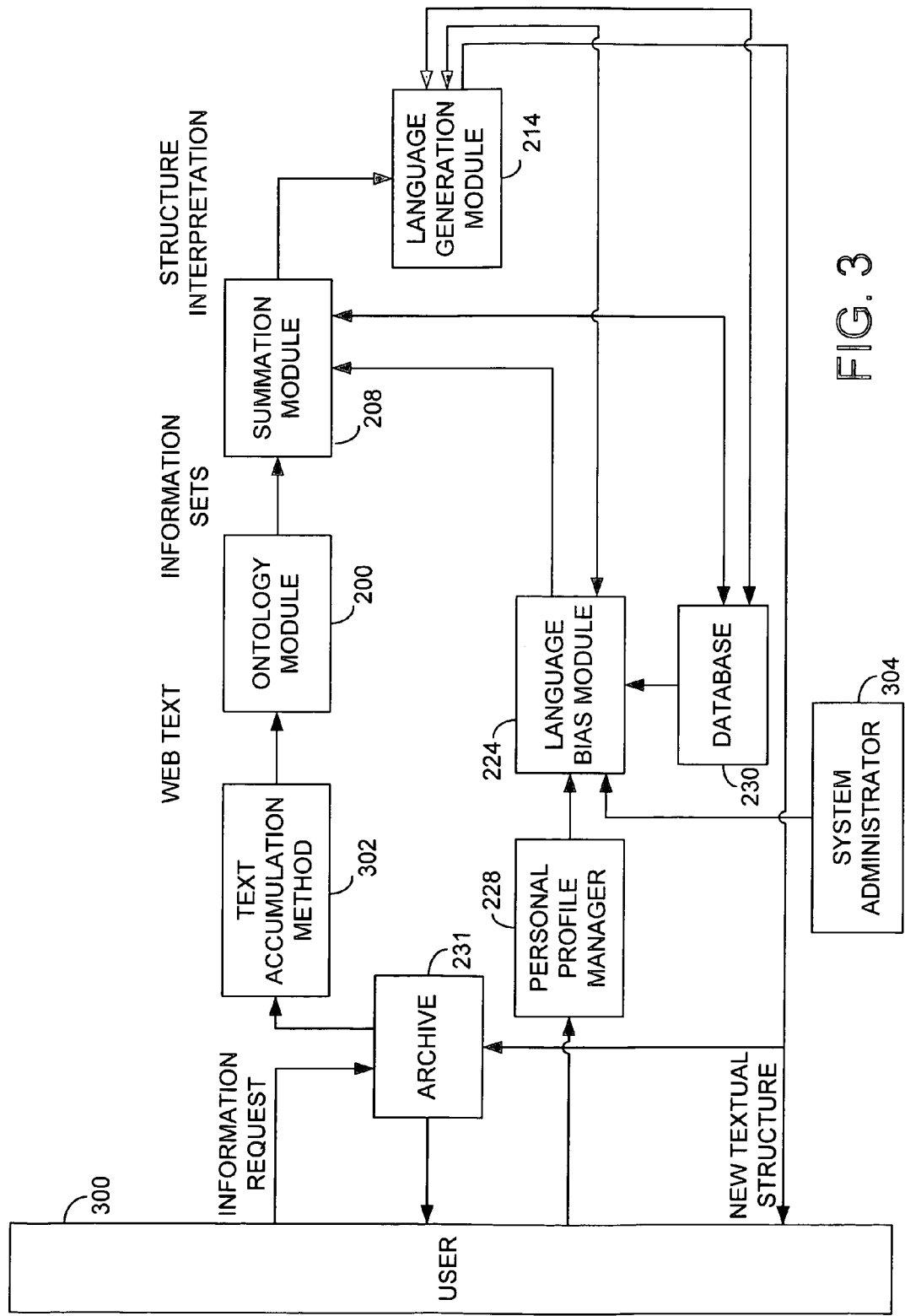
FIG. 3 is a flow diagram of a system for generating a textual structure that summarizes information provided by various web pages or blogs about a specific subject, according to embodiments of the present invention.

FIG. 3 is a flow diagram of a system for generating a textual structure that summarizes information provided by various web pages or blogs about a specific subject, according to embodiments of the present invention. As illustrated in FIG. 3, user 300 makes a request for information about a specific topic. In an embodiment, user 300 is any person or entity with access to the system. In an embodiment, user 300 subscribes to a service and provides user-specific parameter information, which is stored in personal profile manager 228. Parameter information may include any information unique to user 300, such as, for example, geographic location, political association, gender, age, ethnicity, etc. Archive 231 is checked to determine whether it contains an answer to user 300's request. If so, the archived answer is returned to user 300. If not, text accumulation method 302 is initiated.

Text accumulation method 302 obtains web sites, home pages, and other online documentation via traditional search technologies. Text accumulation method 302 may pull from or push to search technologies. Examples of traditional search technologies include, without limitation, web crawlers, RSS-based search engines and feeds, and Atom-based search technologies. A web crawler is a program that browses the Web in a methodical, automated manner. One embodiment of a web crawler browses the web sites contained in a list in search of information. Examples of web crawlers that are well known in the art include PolyBot, WebRace, Ubicrawler, Fast Crawler, WIRE, WebFountain, Mercator, etc. Furthermore, an RSS-based search engine searches RSS feeds, which are text-based XML files containing a list of items. RSS refers to either real simple syndication, rich site summary, RDF site summary, or a variation depending on the RSS version. Such a list of items may include, for example, a title, summary, URI, or similar information that can be searched for relevant keywords. Examples of RSS-based search engines that are well known in the art include, without limitation, Feedster, Daypop, BlogDigger, Fastbuzz, Complete RSS, easyRSS, Medlogs, Edu_RSS, etc. Similarly, Atom-based search engines search lists of items, which are relatively more complex than RSS lists. Any combination of these search engines may be used to find web text necessary for satisfying user 300's request. In addition, other search methods are well known in the art and can readily be used as text accumulation method 302. In an embodiment, text accumulation method 302 is limited to date specific context so that old or irrelevant information can be avoided. For example, text accumulation method 302 can be set to not search for any blogs posted prior to May 2005. However, embodiments of the present invention are not limited to any particular type of search technology or text accumulation method.

In an embodiment, web text from text accumulation method 302 is sent to ontology module 200, which parses the text. To create useful information, ontology module 200 classifies and categrizes textual structures from web pages into information sets, and stores the information sets. Information sets are then stored in storage module 206 or database 230 for later use. In an embodiment, ontology module 200 pulls web text from text accumulation method 302. In another embodiment, text accumulation method 302 pushes web text to ontology module 200.

For example, where user 300 wishes to find out information about a particular nominee for the United States Supreme Court, text accumulation method 302, in one embodiment, may produce two web pages and one blog containing information about the nominee. The first page reports that the nominee is a graduate of a particular law school. The second page names the nominee's political party affiliation. The blog negatively critiques the nominee's judicial opinions and classifies the nominee according to his strict constructionalist application of the law. Ontology module 200, in an embodiment, parses the text and creates three information sets. The first set comprises the name of the law school. The second set comprises the political party. The third set comprises constitutional philosophy, e.g., "strict constructionalist." These three sets are stored either in storage module 206 or database 230 for future retrieval. Of course, embodiments of the present invention are not limited to any particular example or number of information sets.

In an embodiment, summation module 208 receives or accesses the information sets and creates at least one structure interpretation of the information by executing matching routines across all stored information sets. In operation, summation module 208 summarizes information contained across all of the accumulated web documents to the same level of parsing and categorization of ontology processor 200. Looking again at the example discussed above, a structure interpretation would include, for example, "Harvard Law School," "Republican," and "strict constructionalist." Structure interpretations are stored either in storage module 212 or database 230. However, embodiments are not limited to any particular structure interpretation. In an embodiment, summation module 208 uses predefined bias preferences stored in language bias module 224 to customise structure interpretations by omitting or modifying information accumulated from information sets.

In an embodiment, after ontology module 200 processes and catergorizes all of the accumulated web documents and summation module 208 summarizes all information sets to the same level of parsing and categorization, language generation module 214 creates a new textual structure answering the user's request. To create a new textual structure, in an embodiment, language generation module 214 receives, or accesses, the structure interpretation generated by summation module 208. Using the structure interpretation and rules generation module 217, language generation module 214 creates a new textual structure, which is stored in archive 231. In an embodiment, the new textual structure is a phrase or grammatically correct sentence describing the structure interpretation. In an embodiment, the bias preferences created by language bias module 224 are used by language generation module 214 to customize the new textual structure according to preferences set by the user or system administrator. Thereafter, the new textual structure is displayed to user 300 via a web page, e-mail, set-top box, or other means of communication. However, embodiments are not limited to any specific media, as other ways of communicating the textual structures created by language generation module 214 may also be used.

In embodiments, language bias module 224 stores and transmits bias values of particular sources and words to language generation module 214. Then, in an embodiment, language generation module 214 creates new textual structures and modifies newly created textual structures according to bias preferences. To accomplish this, in an embodiment, language generation module 214 becomes selective with the words chosen for the newly generated textual structure. In embodiments, open sources of definitions are again cross-refernced to select the appropriate words for building a new structure. For example, if a person specifies they are sensitive to becoming older, language generation module 214 would select the word "mature," instead of "old," to describe an elderly person.

In the presidential nomination example discussed above, suppose user 300 is a Republican who does not wish to view Democrat-bias sources, and the blog is a pro-Democrat publication. Initially, language generation module 214 would create a sentence such as "John X is a Republican who graduated from ABC law school and is a strict constructionalist." However, in an embodiment, language generation module 214 would then overlay the bias preferences of language bias module 224 to customize the generated textual structure. As a result, the newly generated sentecence would be reformatted to read "John X is a Republican who graduated from ABC law school." This would effectively eliminate the pro-Democrat statement that Roberts is a "strict constuctionalist" from the textual structure.

Figure 4:
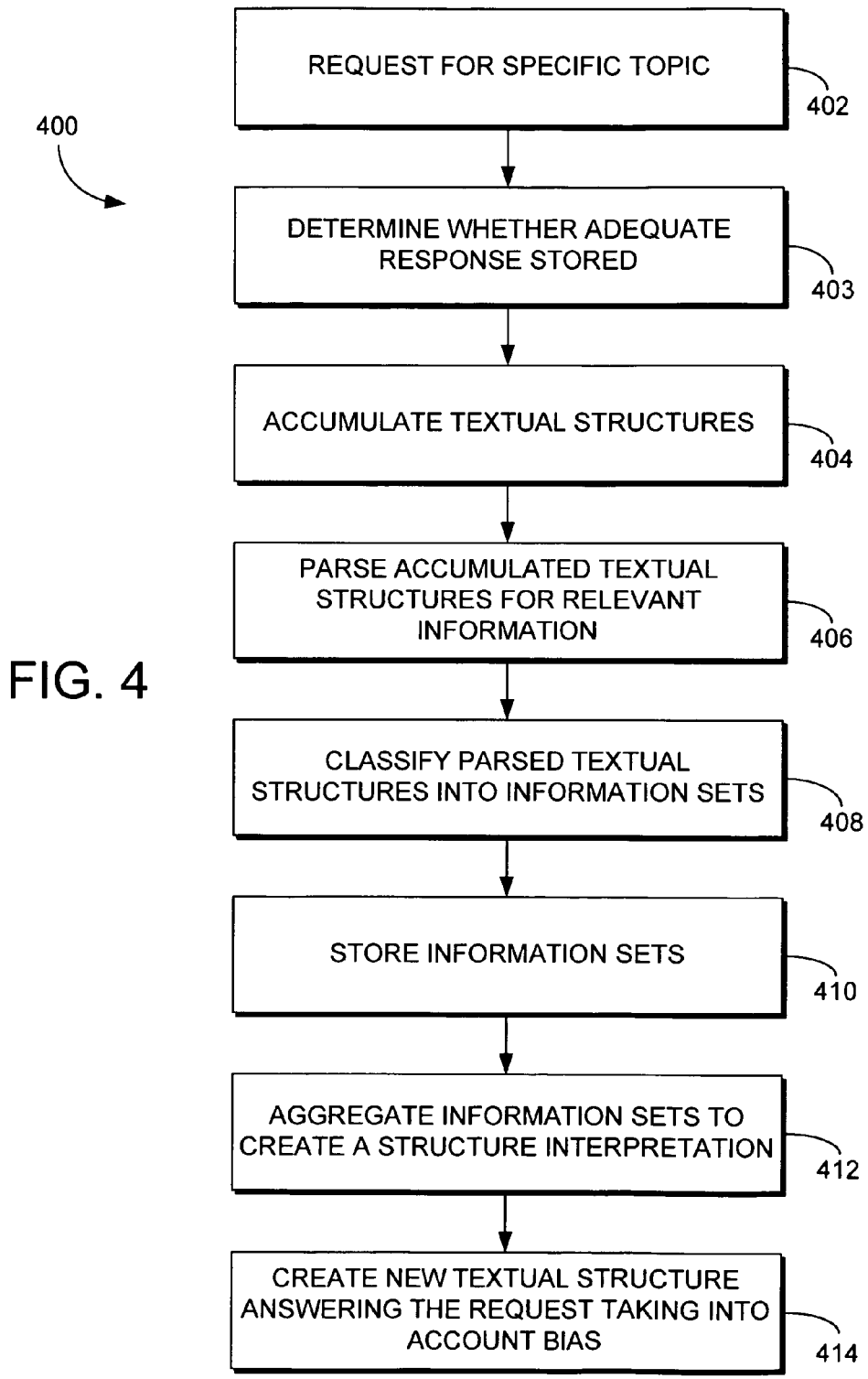
FIG. 4 is a flow chart of a process for generating a textual structure that summarizes information provided by various web pages or blogs about a specific subject, according to embodiments of the present invention.

FIG. 4 is a flow chart of a process for generating a textual structure that summarizes information provided by various web pages or blogs about a specific subject, according to embodiments of the present invention. As illustrated in FIG. 4, in one embodiment, a request for a specific topic is made (402). In another embodiment, a machine-to-machine request is made. Once a request is received, it is determined whether an adequate response is stored (403). If an answer to the request is not archived, textual structures are accumulated (404) from various web pages, blogs, or other online documentation. The accumulated textual structures are parsed for relevant information (406) and classified into information sets (408). The resultant information sets are stored (410) and aggregated to create a structure interpretation (412) of the information. New textual structures are then created answering the request (414) and customized according to bias preferences.

Figure 5:
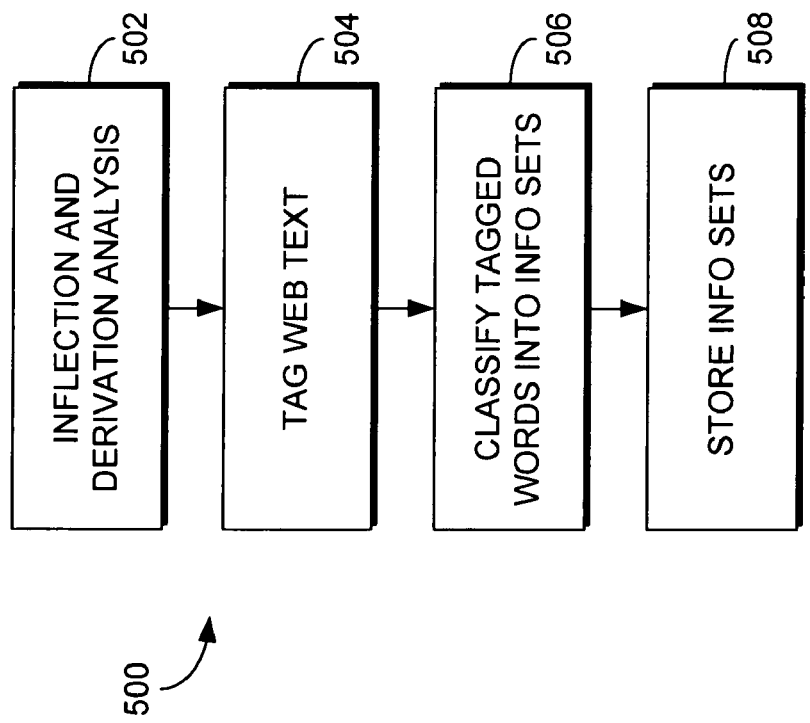
FIG. 5 is a flowchart illustrating a process that parses and classifies web textual structures, according to embodiments of the present invention.

FIG. 5 is a flowchart illustrating a process that parses and classifies web textual structures, according to embodiments of the present invention. In method 500, an inflection and derivation analysis is performed (502) on the gathered text. The inflection and derivation analysis classifies and categorizes all words or phrases with appropriate markers (e.g. numeric, alphanumeric, etc.) or pointers. However, for most language, simple derivatives of words change the complete definition and interpretation of the base meaning. For example, "kind" and "unkind" have different meanings. In one embodiment, the inflection and derivation analysis accounts for such differences by first defining and redefining various derivatives of words (e.g. "past" vs. "passed" vs. "passing"). Then, each word is compared with the base use of the word as well as the various derivatives. Once the probability is determined that the classification of the new word is as close as statistically possible, in an embodiment, the new word, or a marker referring to the word, is stored into a database or computer storage module with an accompanying marker for future analysis. In an embodiment, the inflection and derivation analysis parses the accumulated text, reveals the accumulated text's underlying syntax and grammatical intent, and tags the accumulated text (504) according to predefined rules. In an embodiment, parsing rules allow for specific parsing of relevant and predefined data topics to focus specifically on the particular category being searched. For example, parsing can be geared toward virtually any criteria, such as Supreme Court nominee names, education, previous appointments, political positions, family, etc. In addition, predefined ancillary categories may also be used to assist parsing as well.

In an embodiment, the resultant web text is tagged (504) and classified into information sets (506). These information sets are stored (508). Returning to the above example again, an information set would not include both the Supreme Court nominee's political affiliation and law school, because they were obtained from different web pages. Rather, two separate sets would be created for each. However, embodiments of the present invention are not limited to any particular number of sets. Also, embodiments are not limited to any particular type of information. For example, age may be a set.

In an embodiment, ambiguous and slang words are also analyzed. Words that lexical analysis module 202 does not understand may be sent to a specialized computer, dictionary, or library structure with custom rules for slang, new, unknown, or ambiguous words. Such resources include, for example, slang, dialect, and various other dictionaries.

Figure 6:
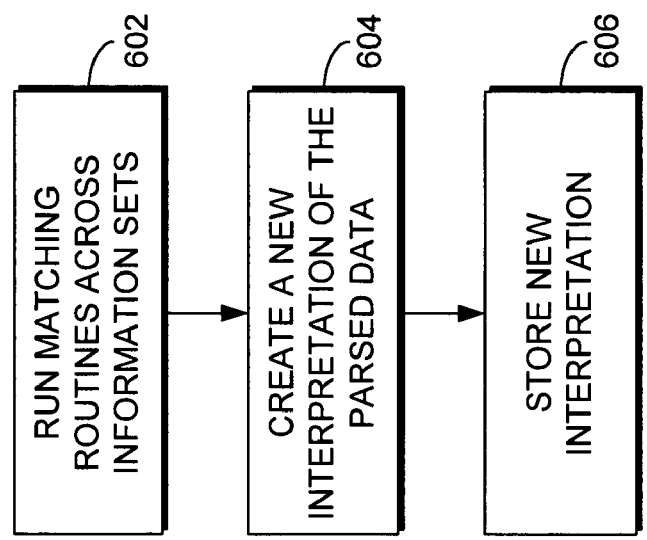
FIG. 6 is a flowchart illustrating a process that aggregates and summarizes web textual structures, according to embodiments of the present invention.

FIG. 6 is a flowchart illustrating a process that aggregates and summarizes web textual structures, according to embodiments of the present invention. In method 600, matching routines are run across all of the stored information sets (602). These routines compare the underlying syntactical structure and definition of each textual structure in an information set with the underlying syntactical structures and definitions of each textual structure in all other information sets. The matching routines keep track of the number of times similar textual structures are stored across all information sets. In addition, for each textual structure, in an embodiment, the matching routines count the number of times a subtending word, lexicon, or other closely related word is used in each information set. For example, if one information set stores that "John X is old," and another set stores that "John X is elderly," the matching routines will associate the two phrases because the words "old" and "elderly" are possible synonyms. However, embodiments are not limited to any specific example. From the matching routines, a new interpretation of all the information sets is formed (604). The new interpretation is then stored (606).

Figure 7:
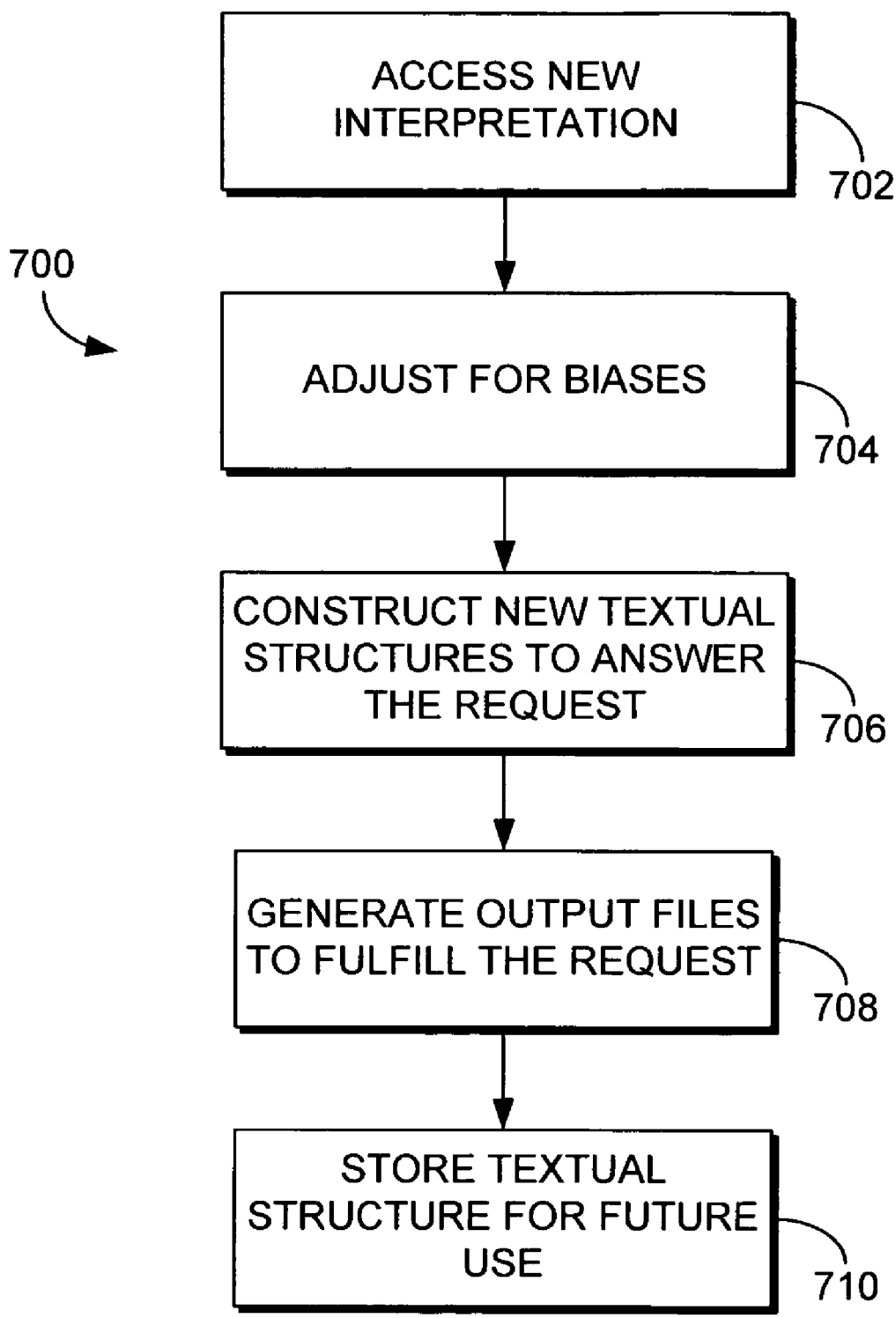
FIG. 7 is a flowchart illustrating a process that adjusts aggregated web information according to web source bias and generates new textual structures that detail the aggregated web information, according to embodiments of the present invention.

FIG. 7 is a flowchart illustrating a process that adjusts aggregated web information according to web source bias and generates new textual structures that detail the aggregated web information, according to embodiments of the present invention. In method 700, the newly created interpretation is accessed (702) and adjusted to account for source bias (704). In another embodiment, predefined grammatical templates are applied to alleviate bias. In an embodiment, these templates add language to the structure interpretation or remove language from the structure interpretation to eliminate bias. In another embodiment, bias eliminating templates are used. However, embodiments of the present invention are not limited to any specific means for eliminating bias.

After the information sets have been modified to account for bias, a new textual structure is constructed to fulfill the request (706), and an output file comprising the new textual structure is generated (708). In an embodiment, the new textual structure is a grammatically correct sentence or plurality of sentences. In another embodiment, an audio or video output file is constructed to fulfill the request. Predefined rules of grammar and syntax, Bayes Classifiers, regression analysis and multi-variable regression analysis techniques, correlation analysis, or multinomial modeling techniques can be used to construct a new textual structure. Regression analysis and multi-variable regression analysis techniques can establish the general statistical methods to define the probability of the correct usage or context of words within a sentence. For example, if the word "dog" is used multiple times in the various documents as a noun, in the context of an animal, then there is a higher probability that the next use of the word "dog" will also be used again in the same context. Regression analysis and multi-variable regression analysis techniques can be implemented in software, for example, by using infinite or finite state machines. However, embodiments are not limited to any type of software implementation, as other well known software techniques may also be used. In an embodiment, the results of specific analyses are stored in a database or other computer-readable media and later referenced for further analysis and sentence regeneration. With respect to sentence regeneration, templates can be used in conjunction the regression analysis methods to generate new textual structures. In an embodiment, basic and complex sentence structures are constructed based on the frequency use of words and classifiers. In another embodiment, a template-based approach is employed. Under this approach, generated nouns, verbs, and adjectives are inserted into template sentence structures. In still another embodiment, template sentence structures are defined in a number of ways, including asking generic questions or defining lists of general definitions. In an embodiment, the newly generated textual structure is stored for future use (710).

In an embodiment, the present invention distributes the newly generated textual structures to the user. The newly generated textual structures may be distributed to a multitude of media-host devices. In fact, embodiments allow the user to submit requests for and receive newly generated textual structures from any media-host device. A media-host device can be referred to as any electronic device capable of sending and receiving data across a network. Thus, the user can just as easily request and receive the newly generated textual structures on a phone, television, computer, PDA, Blackberry, or similar device.

Not only can the textual structure be transmitted directly to the media-host device, it can also be read to the user. In an embodiment, the textual structure is fed into a speech synthesizer (e.g., a text-to-speech recognition engine) and read to the user via a presentation application—such as a talking head or avatar—within the media-host device. For example, if the media-host device is a television, a dedicated channel could display an avatar that reads the summarized information to the user. In another example, a presentation application within a phone could read the textual structure. Avatars are well-known in the art and need not be discussed at length. Furthermore, embodiments are not limited to any particular type of presentation application.

In addition, accompanying audio files, video clips, photographs, or other stored multimedia can be transmitted simultaneously with the textual structure to the user. For example, a textual structure summarizing a war could be transmitted along with a map of the demographic location of the area the war took place. In another example; a summary of the opinions regarding a recent police brutality incident could be transmitted along with a video of the incident.

Figure 8:
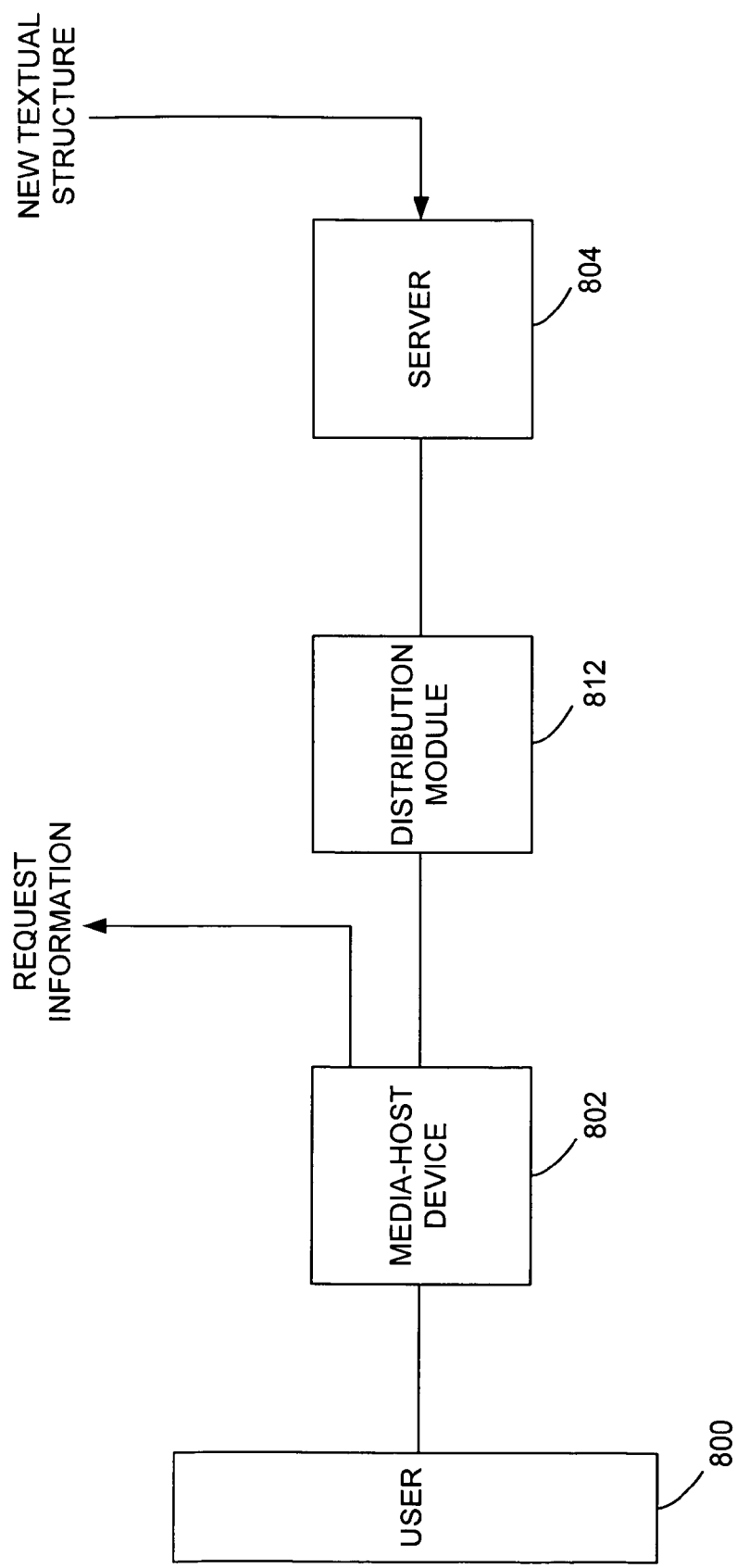
FIG. 8 is a flow diagram of a system for distributing a newly generated textual structure to a media-host device, according to embodiments of the present invention.

FIG. 8 is a flow diagram of a system for distributing a newly generated textual structure, according to embodiments of the present invention. As illustrated in FIG. 8, a system to distribute newly generated textual structures to user 800 comprises media-host device 802, server 804, distribution module 812, or any combination thereof. In an embodiment, media-host device 802 comprises any electronic device capable of sending and receiving data across a network. For example, computers, telephones, television channels, set-top boxes, PDAs, BlackBerrys, etc. may all be media-host device 802. Embodiments are not limited, however, to any particular type of device. In an embodiment, server 804 comprises any computer server, computing device, or software capable of executing a task or instruction for a client device, including television and video distribution systems. Additionally, server 804 further comprises, in embodiments, a memory structure similar to any of the previously mentioned computer-storage media. In an embodiment, distribution module 812 comprises various devices and processes for communicating data between multiple computing devices. Distribution module 812 may include various network infrastructures and electronic components. For example, but without limitation, distribution module 812 may comprise an intranet, proprietary network (e.g., inner-office network), wireless network, radio frequency (RF) network, IP address, air interface, transcoder, cable network, Ethernet cable, coaxial cable, satellite-dish network, telephone line, fiber-optic line, DSL connection, cable network, or other telecommunication media and accompanying electronic components. In addition, distribution module 812 may further comprise intermediate components, such as an intermediate gateway server that bridges data transfer between a media-delivery network, such as a cable-television network, and a communications network, such as a RF network.

In an embodiment, connections between the components in FIG. 8 represent data-transmission lines. However, embodiments are not limited thereto. For example, the components may be coupled wirelessly. Transmission of data between components can be performed through numerous methods. For example, without limitation, data can be moved using packet-switching techniques, circuit-switching techniques, wireless telecommunications, hard-wired connections, etc., or any combination thereof. Embodiments are not limited, however, to any particular type or combination of data-transmission lines.

As illustrated in FIG. 8, user 800 requests a summary of media data through media-host device 802. Media data is any electronic data. For example, media data can be text metadata, digital photographs, digital sound, video clips, etc. In an embodiment, media-host device 802 presents an interface to user 800 allowing submission of the request. For example, the request can be typed into a field on a web page, designated-cable channel, wireless e-mail device, or phone. As previously mentioned, media-host device 802 comprises numerous electronic devices; therefore, a plurality of methods exists for specifying the request. Once prompted, user 800 can enter and submit a request for the summary.

After the user submits the request, a new textual structure is generated, in embodiments, to fulfill the request. Various methods and components used to generate the new textual structure have previously been discussed. In one embodiment, a memory structure (e.g., a database, cache, server, etc.) is first checked to determine whether the textual structure has already been generated and saved. If so, the saved textual structure is saved in server 804. If not, textual structures are accumulated from various data feeds. Data feeds comprise any network-accessible electronic data source. Examples of data feeds include web pages, blogs, proprietary databases, etc. The accumulated textual structures are parsed for information relevant to the request and classified into information sets. The resultant information sets are stored and aggregated to create a summary of the information. New textual structures are then created answering the request and customized according to user 800's bias preferences, which are stored in a personal profile manager. The newly created textual structures are then saved in server 804. In addition, server 804 may also store multimedia (e.g., audio files, video clips, photographs) that either accompany or further explain the textual structures.

Server 804 transmits the textual structure to media-host device 802 via distribution module 812. In an embodiment, the textual structure may first need to be formatted in order to be presented on media-host device 802. For example, user 800 may have specified a preference for an audio transmission of the textual structure to be presented to the user via a presentation application resident on media-host device 802. Before presenting to user 800, distribution module 812, in an embodiment, inputs the textual structure into a speech synthesizer (e.g., a text-to-speech recognition engine) before transmitting to media-host device 802. Speech synthesizers are well-known in the art and need not be discussed at length herein. Examples of speech synthesizers include AT&T Natural Voices Text-to-Speech Engine, Bytecool's CoolSpeech 5.0, Bell Labs' Text-to-Speech system, etc. The resultant audio can then be transmitted to media-host device 802 and presented to the user via the presentation application. In an embodiment, the presentation application comprises any software that plays audio files. Such software is well-known in the art and need not be discussed at length.

A telecommunications network that provides telephone services is usually owned by a telecommunications-service provider and is separate from a television network that provides television programming and is owned by a television-service provider. In an embodiment, distribution module 812 permits communication between server 804 communicating on a communications network, such as a mobile telecommunications network, and media-host device 802 communicating on a media-delivery network, such as a cable-television network, by interfacing the two networks, for example, at a cable headend. In another embodiment, distribution module 812 comprises a carrier or ISP agent to distribute media data from server 804 to a web page viewed by user 800.

Distribution module 812 comprises methods and components for communicating media data, which may include the textual structure and accompanying photographs, audio, video, or other electronic files, to media-host device 802. In an embodiment, distribution module 812 transmits media data to media-host device 802 across a communications network. While the type of communications network described in an embodiment herein is a telecommunications network, one skilled in the art will appreciate that the present invention may be implemented with other types of communications networks permitting the multi-directional exchange of information (in any format, including analog). For example, distribution module 812 can transfer media data across a cable, proprietary, radio, satellite, fiber optic, infrared, or similar network.

In one exemplary process, media-host device 802 sends a request for summarized electronic data to server 804. In an embodiment, the request is a user command. In an embodiment, server 804 has a permanent network address, which media-host device 802 maintains in its memory such that media-host device 802 can direct the request directly to server 804. In another embodiment, media-host device 802 does not maintain the network address for server 804, and a component, such as an intermediate gateway server, provides a network address translation (NAT) function.

Network address translation may be performed by a number of methods. For example, the translation may be between an identifier of media-host device 802 and the network address of server 804. In such an embodiment, server 804 sends the request to an intermediate component, such as the intermediate gateway server. Media-host device 802 includes with the request an identifier of server 804, such as an electronic serial number (ESN), authentication key (A-key), or network address. The intermediate gateway server maintains data to permit translation between the identifier and the network address of server 804.

In an embodiment, the translation is between an identifier of server 804 and the network address of server 804. In such an embodiment, media-host device 802 may maintain data relating to an identifier for server 804, such as a medium access control (MAC) address. In an embodiment, medium-host device 802 sends a summary request, which includes the identifier, to the intermediate gateway server, which maintains data to permit translation between the identifier and the network address of server 804.

In an embodiment, media-host device 802 may have an MAC address, which will typically be assigned to the device by the manufacturer and will identify media-host device 802 with a unique physical device. In operation, each time media-host device 802 is powered on, it may be registered and authenticated, and the communications network may assign media-host device 802 a network address to use until the next time media-host device 802 is booted up. It is to this network address that any data bound for media-host device 802 may be transmitted. Distribution module 812 may then associate the MAC address of media host device 802 with the assigned network address of media-host device 802. Through this association, the user's account has a unique identifier associated with a unique network address on the communications network. In an embodiment, this network address will be an IP address, and the communications network will use IP routing to transmit cable-television content and other data to media-host device 802. Proprietary addressing schemes, however, such as a virtual private network (VPN), cable network, or non-routable Private IP network may be used as well.

In an embodiment, distribution module 812 identifies media-host device 802 by an identifier. For example, media-host device 802 may be identified using a unique Electronic Serial Number (ESN), which is typically hard-coded into the device; a unique Mobile Identification Number (MIN), which is typically assigned to the device by a telecommunications-service provider; a special authentication key (A-key), which may be used for validating media-host device 802's identify; or a predetermined username and password. In addition, distribution module 812 may be capable of packet-data communication using a network address (e.g., an IP address) to identify media-host device 802. The network address may be permanently assigned to media-host device 802 or may be dynamically assigned using a number of methods, such as a simple IP process or a mobile IP process.

Sending either the request to server 804 or media data to media-host device 802 may require translation. Distribution module 812 employs any method of translation, such as translation based on an identifier of server 804, an identifier of media-host device 802, or a user location. The transfer may or may not require network-address translation. If network-address translation is required, any of the previously-mentioned translation methods may be employed.

In an embodiment, the media data requires conversion between a native format on server 804 and a format acceptable for the media-host device 802. For example, the textual structure may reside on server 804 in a 480i or 1080 p MPEG2 format, while mobile media-host device 802 may only be capable of receiving and presenting content in MPEG4 format. Thus, the textual structure may have to be converted from the native format to the MPEG4 format. Conversion can be employed by a number of components within the scope of the invention. In one embodiment, server 804 saves the media content in multiple formats. In another embodiment, server 804 converts the textual structure. Format conversion may be performed by a single component or may be accomplished using multiple components. For example, server 804 may provide an initial conversion, and distribution module 812 may provide additional conditioning required for a particular media-host device. In an embodiment, distribution module 812 performs all necessary formatting and delivery of media data between server 804 and media-host device 802. Other methods for formatting data to different media-host devices can also be employed and are generally well-known in the art. The system described in FIG. 8 can also apply to proprietary networks as well as public networks. A proprietary network comprises a collection of computing devices that are connected to one another for a specific entity. One such example is a database for a corporation in which employees have access to files saved globally on a company network. Yet another example is a news service accessible by an organization of journalists. In an embodiment, user 800 can retrieve a textual structure, which accounts for bias parameters and personal traits, summarizing information in the proprietary network. For example, suppose a lawyer who is defending a robbery victim wants to know the most frequently successful argument used by the lawyer's firm in appellate briefs. The lawyer could request a summary of all the firms' successful-appellate briefs advocating a defense for robbery.

Figure 9:
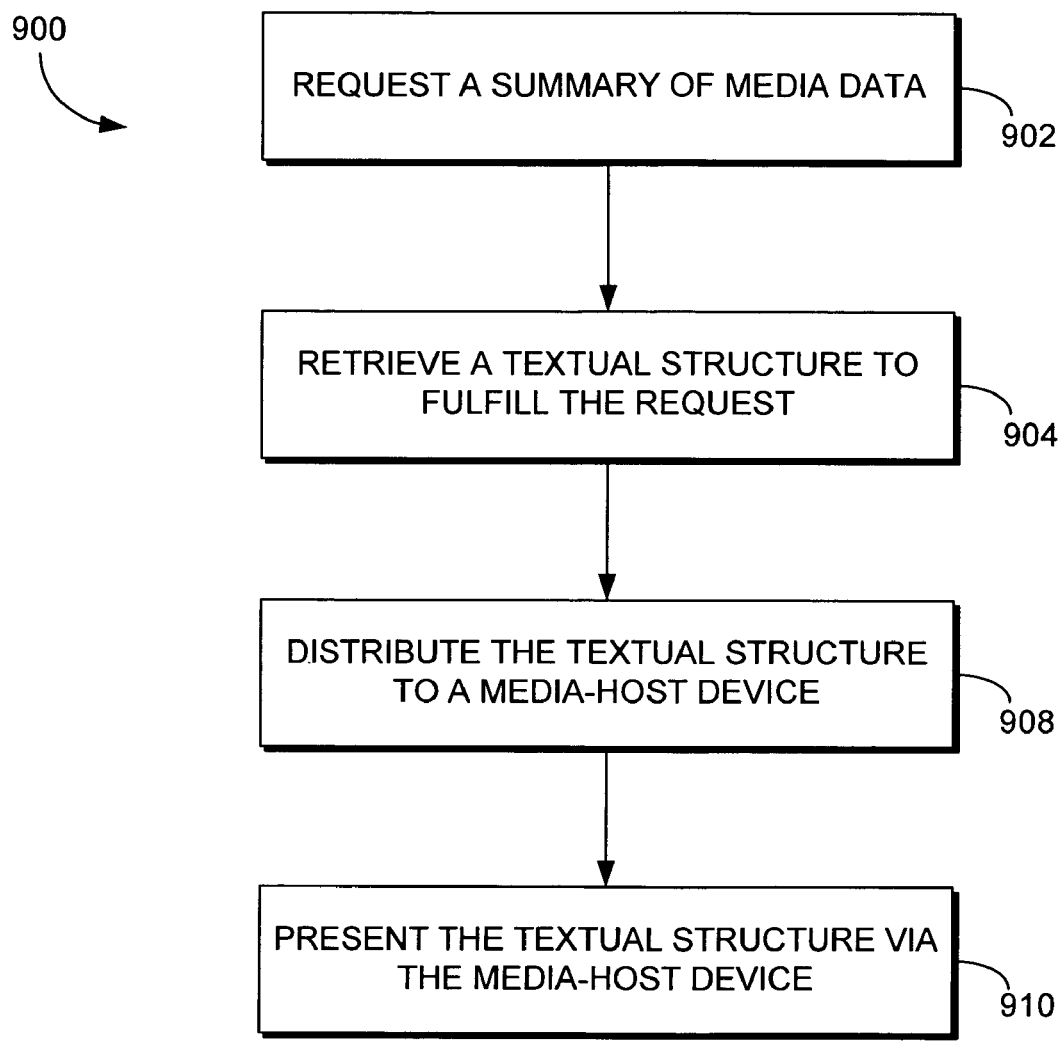
FIG. 9 is a flowchart illustrating a process for distributing a newly generated textual structure to the media-host device, according to embodiments of the present invention.

FIG. 9 is a flowchart illustrating a process for distributing a newly generated textual structure to a media-host device, according to embodiments of the present invention. Method 900 may also be used to distribute accompanying media data in addition to the textual structure. In method 900, a user requests a summary of media data regarding a specific topic (902). Media data comprises any electronic data structure (e.g., a textual structure, photograph, metadata, etc.). As further illustrated in method 900, a textual structure is retrieved to fulfill the request (904). In an embodiment, the textual structure is modified to account for personal bias preferences. In an embodiment, additional media data about the topic is also retrieved. In an embodiment, the textual structure has already been created and is pushed or pulled from a memory. Once retrieved, the textual structure is distributed to a media-host device (908). The media-host device presents the textual structure (910).

Figure 10:
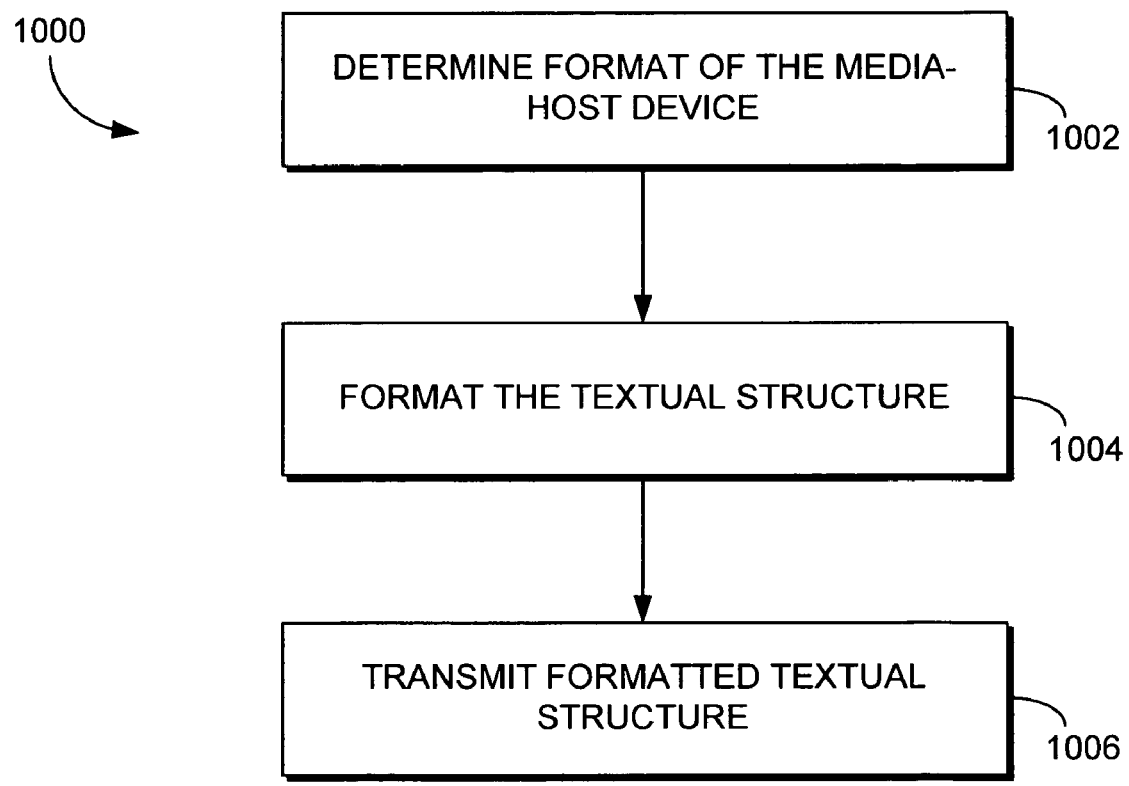
FIG. 10 is a flowchart illustrating a process for distributing the newly generated textual structure to a media-host device, according to embodiments of the present invention.

FIG. 10 is a flowchart illustrating a process for distributing the textual structure to a media-host device, according to embodiments of the present invention. In method 1000, the data format of the media-host device is initially determined (1002). In an embodiment, data format and configuration information are pushed out from the media-host device. In another embodiment, data form a and configuration information are pulled from the media-host device. Once the data format is known, the textual structure is formatted accordingly to be presentable on the media-host device (1004). Following formatting, the textual structure is transmitted to the media-host device (1006). Exemplary transmission methods include wireless, WiMAX, cable, digital subscriber line (DSL), etc. Because a media-host device can be virtually any receptive apparatus for digital information, embodiments will use different methods to transmit the textual structure to different media-host devices. For example, suppose a textual structure needs to be sent to user X and user Y. Furthermore, suppose user X is using a laptop with a wireless connection, and user Y is watching a dedicated channel on a cable network. The same textual structure would need to be sent both wirelessly (i.e., via low-powered radio waves) to X and through a cable network to Y. Embodiments of the present invention are not limited to any particular transmission method.

The hardware included in the systems discussed herein may include memories, processors, and/or Application Specific Integrated Circuits (ASICs). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical, or other form of propagated signals (e.g., carrier waves, infrared signals, digital signals, etc.), etc.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for distributing a textual structure, comprising:
   receiving a request from a media-host device to receive summary data about web content on a plurality of web pages;
   parsing the web content from the plurality of web pages;
   revealing underlying lexical semantics about the web content from the plurality of web pages, wherein the underlying lexical semantics comprise parts of speech and definitions of text in the web content;
   using the underlying lexical semantics to classify the web content into information sets by counting the number of times the text is determined to have a part of speech and a definition;
   applying one or more grammatical templates to organize the information sets into a sentence that summarizes the web content on the plurality of web pages;
   formatting the sentence to be readable by the media-host device; and
   transmitting the sentence to the media-host device.

2. The method of claim 1, wherein the retrieving of the textual structure comprises:
   receiving a request for summarized web information from the media-host device;
   accumulating text from a plurality of data feeds;
   parsing the accumulated text;
   indexing the text into a plurality of information sets;
   storing the plurality of information sets into a memory structure;
   aggregating information contained in the plurality of information sets to create a structure interpretation to satisfy the request; and
   creating at least one new textual structure from the structure interpretation.

3. The method of claim 2, wherein a media server comprises the memory structure.

4. The method of claim 1, wherein the formatting of the textual structure to be readable by a media-host device comprises:
   determining a data format relevant to the media-host device; and
   converting the format of the sentence into the data format of the media-host device.

5. The method of claim 1, further comprising:
   adjusting the sentence to account for parameters in a personal profile manager.

6. The method of claim 1, further comprising:
   converting the sentence into an audio file using a speech synthesizer; and
   presenting the audio file to the user.

7. The method of claim 1, wherein the sentence is transmitted to the media-host device via a wireless network.

8. The method of claim 1, wherein the sentence is communicated to the media-host device via a computer network.

9. The method of claim 1, wherein the sentence is communicated to the media-host device via a cable network.

10. The method of claim 1, wherein the sentence is communicated to the media-host device via a proprietary network.

11. The method of claim 1, further comprising:
determining a location of the media-host device within a network of media-host devices based on a unique identifier for the media-host device.

12. One or more computer-storage media, having computer-readable instructions embodied thereon for performing the method of claim 1.

13. A system for distributing a textual structure, comprising:
a media-host device to request the textual structure that summarizes media data to a user, and to present the textual structure to the user;
a server to;
(1) analyze text on a plurality of web pages,
(2) summarize the text on the plurality of web pages based on the underlying grammatical intent of the text on the plurality of web pages,
(3) automatically create a sentence that summarizes the text on the plurality of web pages, and
(4) store the sentence; and
a distribution module to communicate the sentence to the media-host device and to register the user to automatically receive additional sentences summarizing the media data.

14. The system of claim 13, wherein the distribution module communicates data over a computer network.

15. The system of claim 13, wherein the distribution module communicates data over a cable network.

16. The system of claim 13, wherein the distribution module communicates data over a wireless network.

17. The system of claim 13, wherein the distribution module communicates data over a proprietary network.

18. The system of claim 13, further comprising:
a speech synthesizer to convert the sentence into an audio file, wherein the media-host device comprises a presentation module to present the audio file to the user.

19. The system of claim 13, further comprising:
a personal profile manger to adjust the sentence according to at least one parameter specified by the user.

20. A method for distributing a textual structure comprising:
receiving a request from the media-host device to receive summary data about web content;
summarizing the text on a plurality of web pages by:
(1) accumulating text from the plurality of web pages,
(2) analyzing grammatical intent associated with the text from the plurality of web pages,
(3) applying a statistical analysis to a portion of the text that is associated with multiple grammatical meanings to determine a probabilistic meaning for the portion of the text, and
(4) creating the textual structure to summarize the text based on the grammatical intent associated with the text and the probabilistic meaning for the portion of the text;
manipulating the textual structure based on a user-bias preference specified by the user, wherein the user-bias preference gives more deference to portions of the text from web pages determined to have a certain source bias and gives less deference to portions of the text from web pages determined to have a different source bias;
determining a format of the media-host device;
formatting the textual structure to be presentable on the media-host device; and
transmitting the formatted textual structure to the media-host device.

* * * * *